(12) United States Patent
Bao et al.

(10) Patent No.: US 8,892,546 B2
(45) Date of Patent: Nov. 18, 2014

(54) SEARCH QUALITY VIA QUERY PROVENANCE VISUALIZATION

(75) Inventors: Zhuowei Bao, Philadelphia, PA (US); Benny Kimelfeld, San Jose, CA (US); Yunyao Li, San Jose, CA (US); Huahai Yang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 13/485,541

(22) Filed: May 31, 2012

(65) Prior Publication Data

US 2013/0325831 A1   Dec. 5, 2013

(51) Int. Cl.
*G06F 7/00*   (2006.01)

(52) U.S. Cl.
USPC ........................................... 707/722

(58) Field of Classification Search
CPC .......... G06F 17/30023; G06F 17/3005; G06F 17/30112; G06F 17/30522; G06F 17/30646
USPC ................. 707/706, 708, 723, 722, 726, 748, 707/999.003
See application file for complete search history.

(56) References Cited

U.S. PATENT DOCUMENTS

| | | | |
|---|---|---|---|
| 7,315,872 B2* | 1/2008 | Narang et al. ........................ | 1/1 |
| 7,962,487 B2 | 6/2011 | Liu et al. | |
| 8,099,410 B2 | 1/2012 | Day et al. | |
| 8,150,843 B2 | 4/2012 | Chitiveli et al. | |
| 2003/0120641 A1 | 6/2003 | Pelletier | |
| 2006/0080369 A1* | 4/2006 | Razdow et al. ............... | 707/204 |
| 2007/0055656 A1* | 3/2007 | Tunstall-Pedoe ................. | 707/3 |
| 2008/0120281 A1* | 5/2008 | Marceau et al. ................... | 707/3 |
| 2010/0114629 A1* | 5/2010 | Adler et al. ........................ | 705/7 |
| 2010/0198810 A1 | 8/2010 | Graefe et al. | |
| 2011/0307435 A1* | 12/2011 | Overell et al. ................... | 706/46 |
| 2012/0117048 A1* | 5/2012 | Rosenoff et al. .............. | 707/706 |
| 2012/0166378 A1* | 6/2012 | Valerio et al. ................... | 706/47 |
| 2012/0203782 A1* | 8/2012 | Olston et al. .................. | 707/737 |
| 2013/0278964 A1* | 10/2013 | Zeng et al. .................... | 358/1.15 |

FOREIGN PATENT DOCUMENTS

WO   2008083208   7/2008

OTHER PUBLICATIONS

"Provenance Context Entity (PaCE): Scalable Provenance Tracking for Scientific RDF Data", Satya S. Sahoo, Olivier Bodenreider, Pascal Hitzler, Amith Sheith, Krishnaprasad Thirunnarayan, Knoesis Center Technical Report, 2010.*
"Querying Data Provenance", Grigoris Karvounarakis, Zachary G. Ives, Val Tannen, University of Pennsylvania, Jun. 6-11, 2010.*

* cited by examiner

*Primary Examiner* — Mohammed R Uddin
(74) *Attorney, Agent, or Firm* — Ference & Associates LLC

(57) ABSTRACT

Methods and arrangements for enhancing search quality. Query search results are displayed, and search query provenance related to the search results is graphically depicted. There is graphically accorded an investigative function to avail investigation of at least one aspect of the search query provenance.

16 Claims, 12 Drawing Sheets

501

| Query Tracker | Runtime Rule Editor | Quality Analysis | Index Reports |

Lucene Document of Result #1

- Doc id = 252020
- Title = B'' ep......Global
- URL = http://w?·'
- Source = db2
- Size = 129
- Categories = [contenttypes_community...
- Date - 2008=09-1 12:00:00
- Language = en
- Countries = N/A
- Regions+ N/A
- Sites = N/A
- Tag data = []
- Total tag count = 0
- Description = *Global

535

| Field name | Value |
|---|---|
| Title_name_coverage | Global Cam |
| Title_name_score | 3.2000000047683716 |
| Title_name_begin | 11 |
| Title_name_end | 24 |
| Title_content_ngram | Bluepages |
| Title_content_score | 3.2000000047683716 |
| Title_content_begin | 0 |
| Title_content_end | 24 |
| Title_content_std | ---------- |
| CatchAll_content_std | ---------- |
| CatchAll_content_score | 3.2000000047683716 |

FIG. 5

SEARCH QUALITY VIA QUERY PROVENANCE VISUALIZATION

BACKGROUND

The use of online search engines has proliferated considerably over time. Conventionally, consumers and users have come to expect very rapid search turnaround time, to the point that a return of search results can now be virtually instantaneous.

However, the mere production of voluminous results with rapid turnaround does not always provide a satisfactory body of information for consumers and users to employ. Particularly, it is often the case that that consumers and users wish to understand the results at a finer level or gain insight as to how the results were obtained. Among other things, this can help guide more efficient searching in the future at the consumer/user end. At the same time, even administrators can come to understand and appreciate inefficiencies and shortcomings in how search results are produced, possibly even prompting changes to a search algorithm. Conventional information retrieval systems and arrangements, however, offer little more than a "black box" where insights on the production of search results are difficult if not impossible to obtain.

BRIEF SUMMARY

In summary, one aspect of the invention provides a method comprising: displaying query search results; and graphically depicting search query provenance related to the search results; said depicting comprising graphically according an investigative function to avail investigation of at least one aspect of the search query provenance.

Another aspect of the invention provides an apparatus comprising: at least one processor; and a computer readable storage medium having computer readable program code embodied therewith and executable by the at least one processor, the computer readable program code comprising: computer readable program code configured to display query search results; computer readable program code configured to graphically depict search query provenance related to the search results; and computer readable program code configured to graphically accord an investigative function to avail investigation of at least one aspect of the search query provenance.

An additional aspect of the invention provides a computer program product comprising: a computer readable storage medium having computer readable program code embodied therewith, the computer readable program code comprising: computer readable program code configured to display query search results; computer readable program code configured to graphically depict search query provenance related to the search results; and computer readable program code configured to graphically accord an investigative function to avail investigation of at least one aspect of the search query provenance.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 5 illustrates a UI displaying a Lucene document.

DETAILED DESCRIPTION

Figure 1:
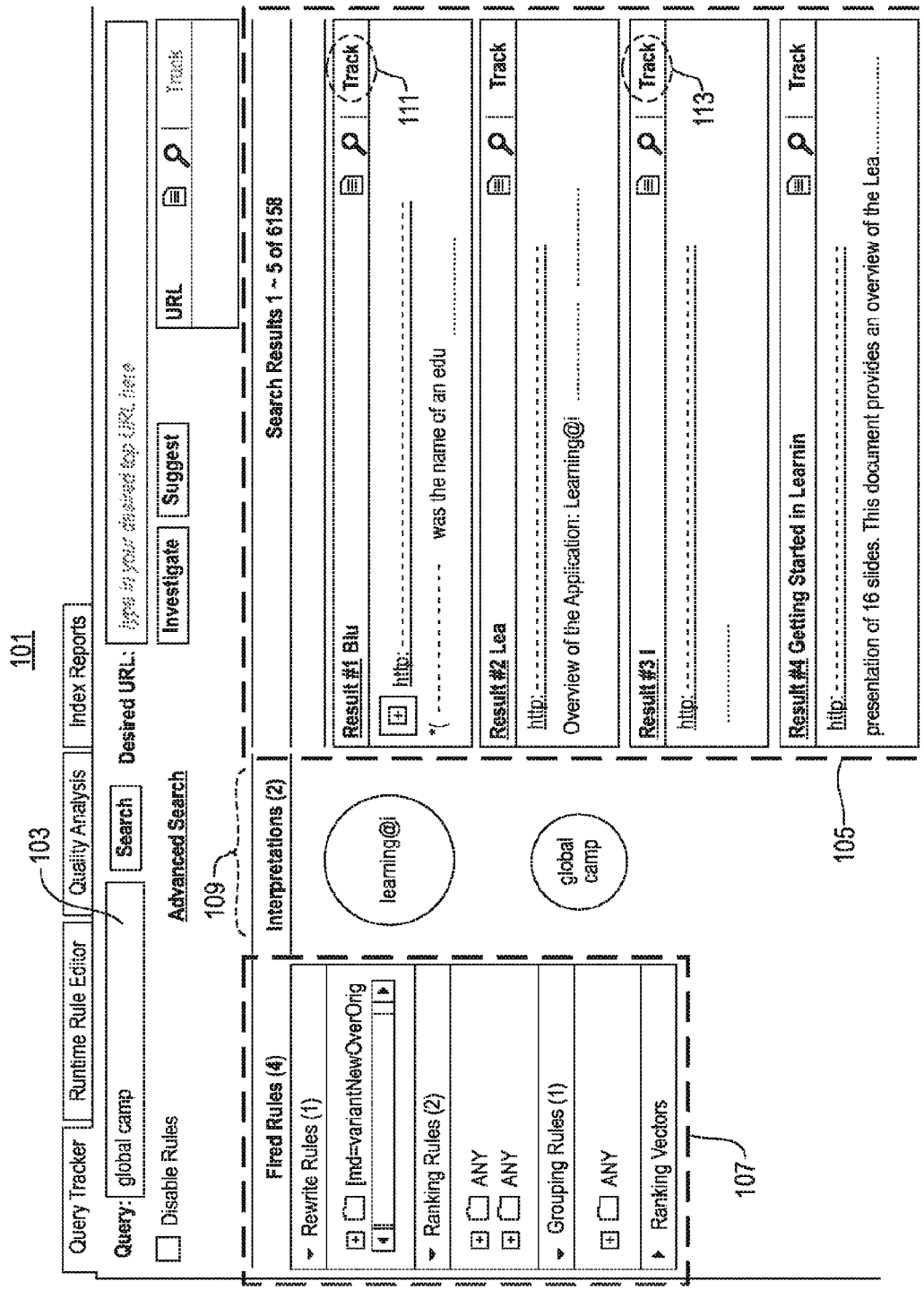
FIG. 1 illustrates a user interface (UI) displaying global decisions regarding a search.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that the various embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-10. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 12. In accordance with an example embodiment, most if not all of the process steps, components and outputs discussed with respect to FIGS. 1-10 can be performed or utilized by way of a processing unit or units and system memory such as those indicated, respectively, at 16' and 28' in FIG. 12, whether on a server computer, a client computer, a node computer in a distributed network, or any combination thereof.

Figure 8:
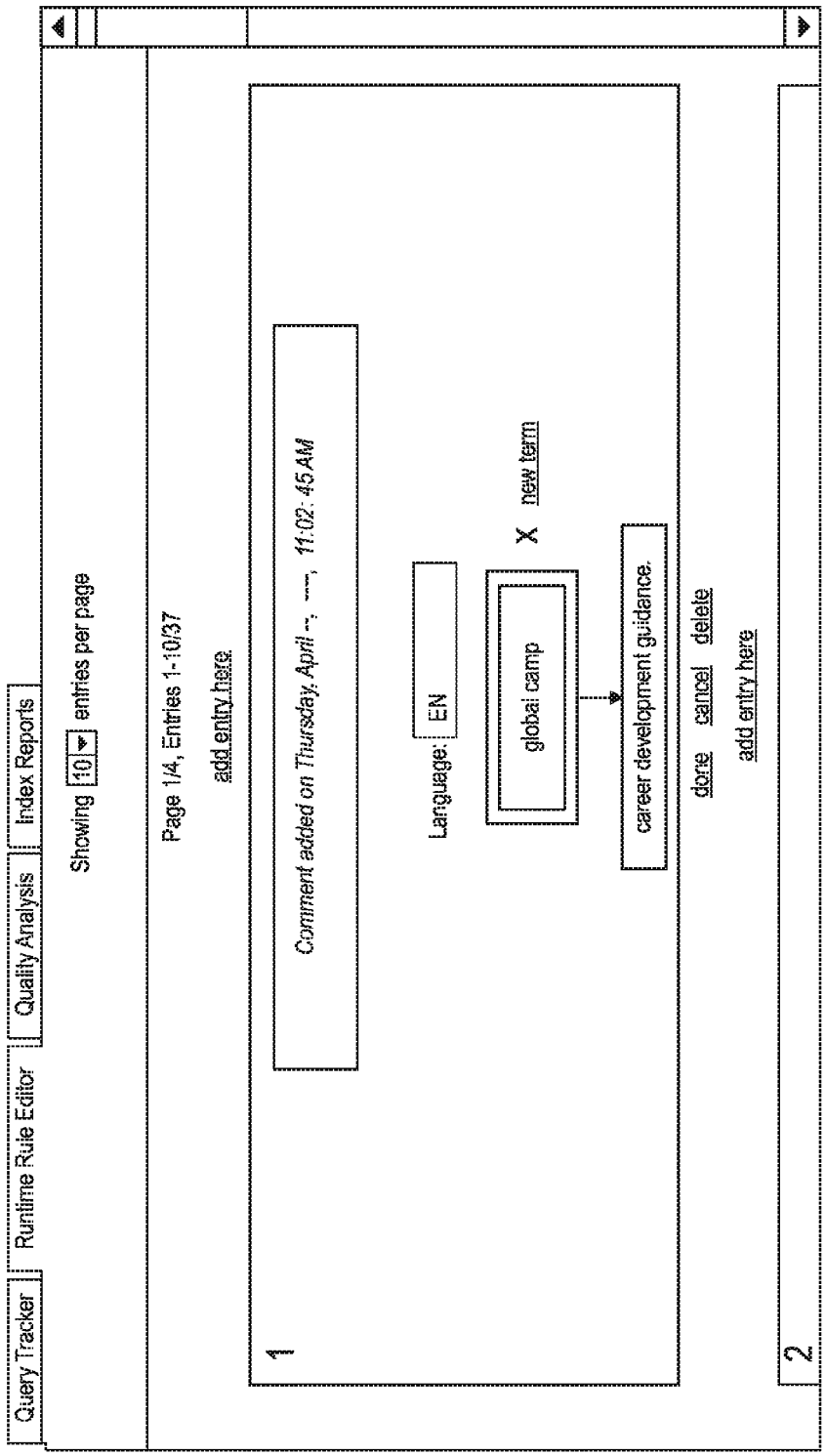
FIG. 8 illustrates a UI providing a rule editing function.
Figure 9:
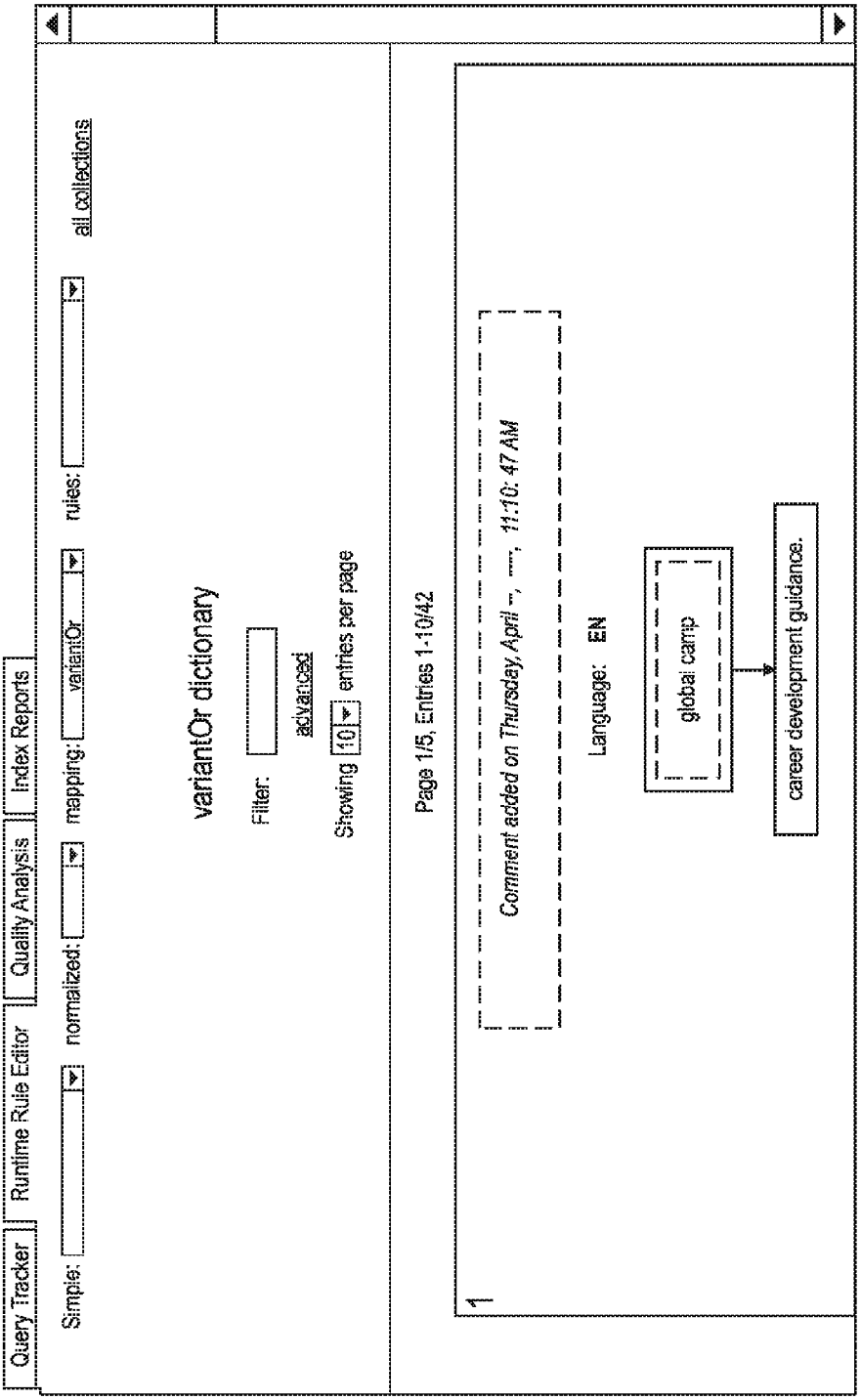
FIG. 9 illustrates a UI providing a saving and reloading configuration.
Figure 10:
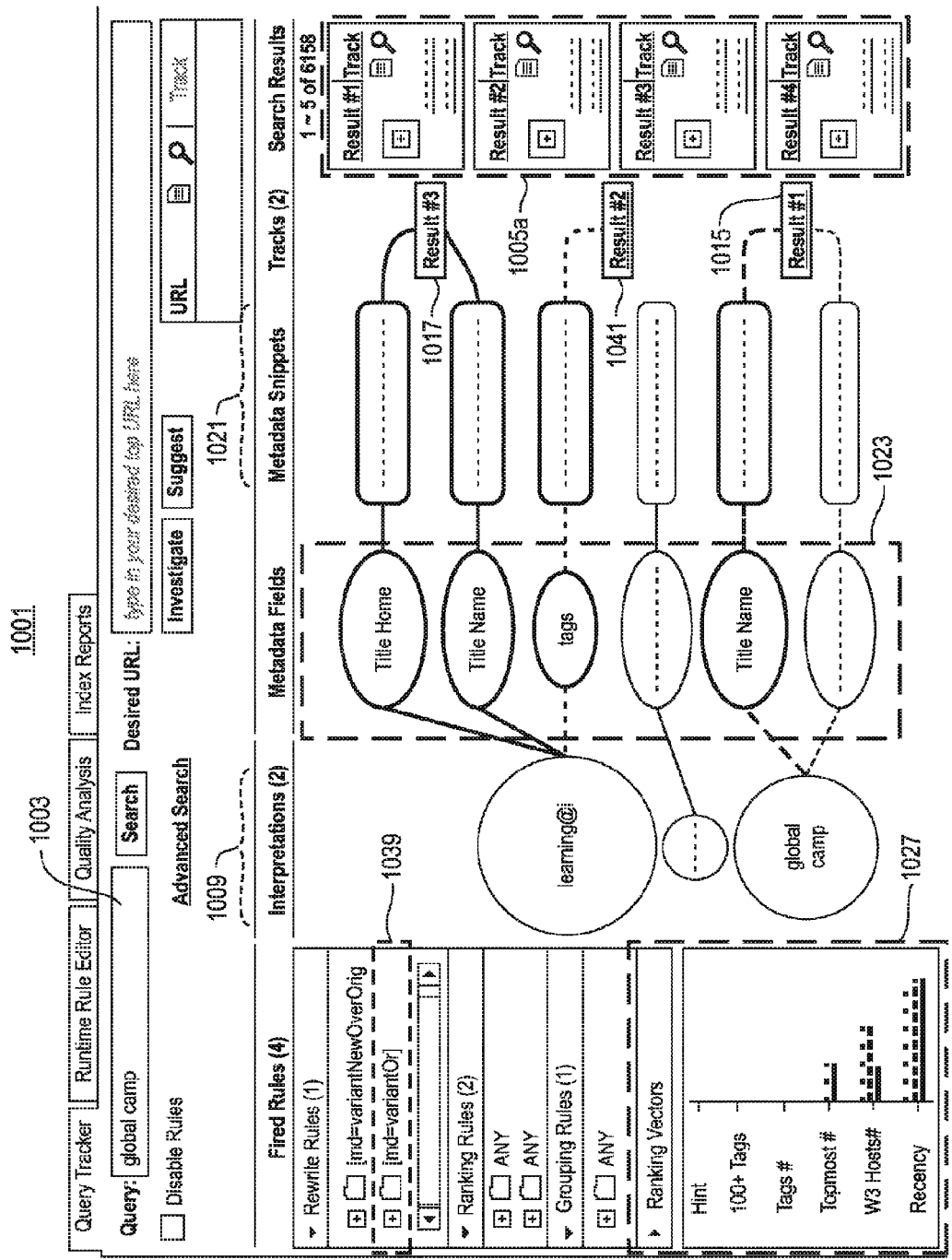
FIG. 10 illustrates a UI providing an effect validation function.

To facilitate easier reference, in advancing from FIG. 1 to and through FIG. 10, a reference numeral is advanced by a multiple of 100 in indicating a substantially similar or analogous component or element with respect to at least one component or element found in at least one earlier figure among FIGS. 1-10.

Broadly contemplated herein, in accordance with at least one embodiment of the invention, are methods and arrangements for affording a visualization of search query provenance. In this connection, methods as broadly contemplated herein can leverage a notion of programmable search, which is based on a fully transparent rule-driven approach towards results ranking.

The term "search query provenance", as employed herein, may be considered, in accordance with embodiments of the invention, to refer to information relating to the chronology, development and/or other contributing factors that imparts an understanding of how a search query result is obtained in the course of executing a search query. Thus, search query provenance can permit an overview or tracking of contributing factors to a search query result through any and all transformations, analyses, and interpretations of a search query (and/or one or more of its components), when a system executes (or acts upon) a search query by way of generating one or more search query results. This can help consumers and users to understand a search query result at a finer level and gain insight as to how the result was obtained.

As such, in accordance with at least one embodiment of the invention, a programmable-search-based system, where the decisions made by each component of the system are known, is leveraged to yield, and effectively display, search query provenance. As such, decisions made by search system components are visualized in a manner to help a search administrator, or even consumer/user, to better understand why a search result is being brought back for a query. A search result can also be ranked relative to other results in the list of results of the same query. Insight can also be gained as to why a document is not being brought back by an initial query. In addition, a visualization arrangement as broadly contemplated herein can also help a search administrator improve search results by providing information that helps in the creation of appropriate rules.

In accordance with at least one embodiment of the invention, there is provided a visualization of all information relating to decisions made by a search system between the input of a search query to the production of each and every search result, thereby according query provenance for each result.

An administrator can then compare multiple results for the same query in a manner to better understand their ranking. An administrator can then also investigate a specific document and understand the ranking of the document in the results set of a query. Information can also be provided to allow a search administrator to modify or add new runtime rules, or fix a backend tokenizer, to improve search quality.

In accordance with at least one embodiment of the invention, a search query provenance provision arrangement can be implemented as a web application based on a client-server side architecture. It can also be implemented as a single application on a desktop, laptop or tablet computer.

FIG. 1 illustrates a user interface (UI) 101 showing global decisions regarding a search, in accordance with at least one embodiment of the invention. As such, when a user types in a query 103 (here, "global campus"), the UI 101 shows, along with the search results 105, some global decisions made by the system about the query 103. Accordingly, UI 101 may show runtime rules 107 that were fired for the query 103, along with interpretations 109 rendered by the search engine. The interpretations 109 are ranked, and the relative size (area) of a circle corresponding to each interpretation may be proportional to the number of results retrieved for each interpretation, and thus to the relative priority accorded to each interpretation. (It should be noted that the functioning of the UI 101 here, and in embodiments, is essentially independent of the search algorithm used. In other words, the search engine may render interpretations 109 in a manner specific to the search engine, while—as long as the search engine provides information explaining which document fields match the query 103—the UI 101 here serves a "reporting" function on how the search was carried out.) For tracking results, a track button 111/113 (here, corresponding to results #1 and 3) may be clicked upon; this function will be better understood in connection with the discussion of FIG. 2 herebelow.

Figure 2:
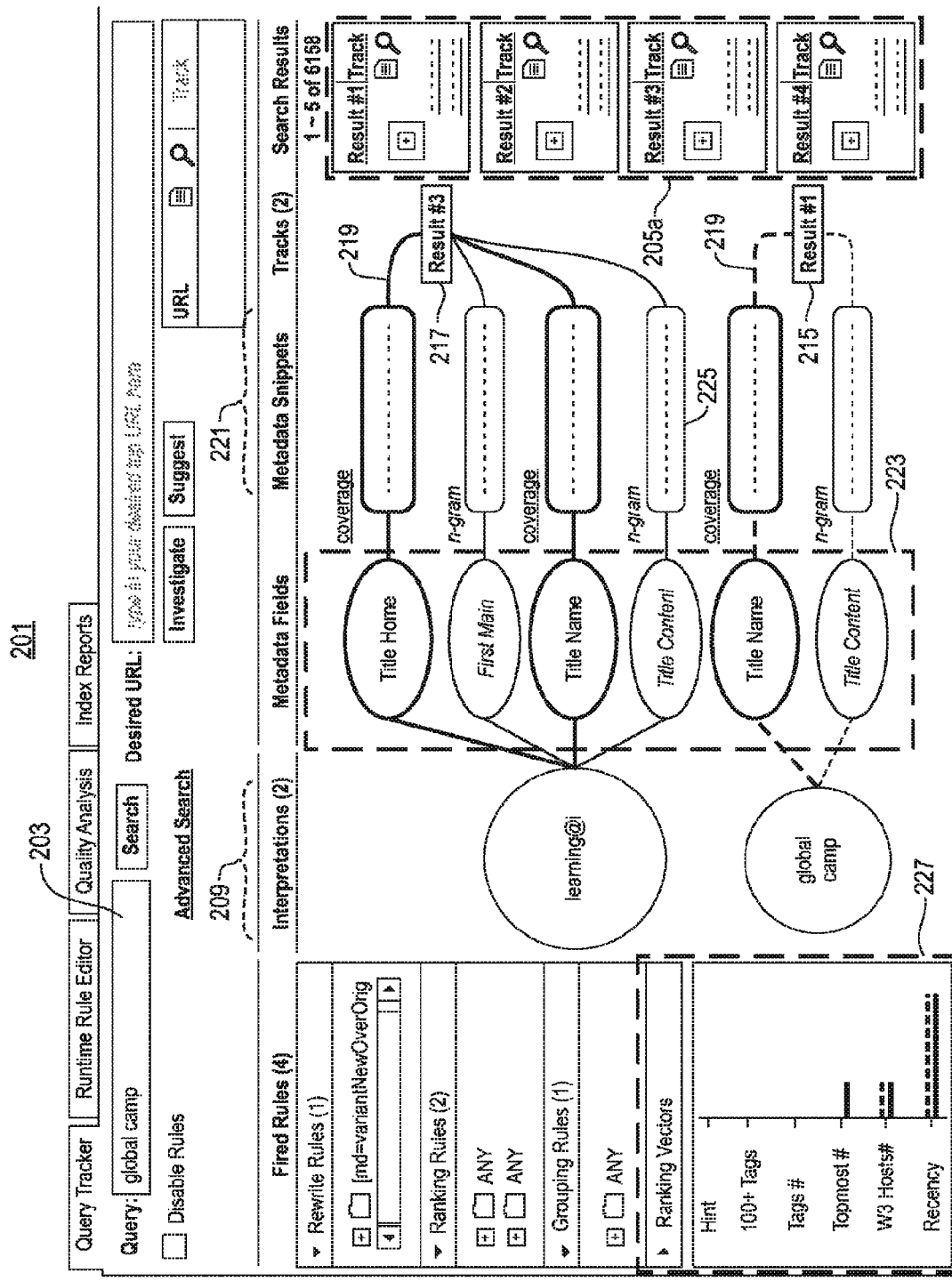
FIG. 2 illustrates a UI providing results tracking.

FIG. 2 illustrates a UI 201 providing results tracking, in accordance with at least one embodiment of the invention. As such, when a user clicks on a track button next to a given result (e.g., such as the buttons 111/113 shown in FIG. 1), the search query provenance provision arrangement obtains all the information of the decisions made by each component of the system via a REST API (representational state transfer application programming interface) and then creates appropriate input to a graph layout program to compute the layout. (For background purposes, one illustrative and non-restrictive example of a graph layout program that can be used is available via GraphViz, www.graphviz.org.) For illustration purposes, FIG. 2 considers the example of clicking on buttons similar to those indicated at 111/113 in FIG. 1.

As such, in accordance with at least one embodiment of the invention, a tracking mode can be evoked wherein results are collapsed to a smaller area (205a) to make room for a graph layout. Using graphical representations of each result selected for tracking (e.g., via rectangles 215/217 representing results #1 and #3, respectively, in the present example), lines 219 can visually emanate from such terminal nodes (215/217) and eventually trace to one or the other circle in interpretations field 209.

Accordingly, in accordance with at least one embodiment of the invention, the graph layout yields metadata fields 223 which, by way of example, may be depicted as ovals. Each metadata field represents a "semantic bucket", and the size of an oval is proportional to the importance of each "bucket". A field of metadata snippets 221 is interposed between the metadata fields 223 and terminal nodes (215/217). Essentially, when a document is analyzed, it will be associated with one or more metadata fields 223, each of which describes a certain property of the document (e.g., document title, author, date of creation, URL contained in the document, the body of the document, etc). The content of each metadata field is described by a snippet of the field (referred to as "metadata snippets" 221 herein), which is typically a substring of the field value.

In accordance with at least one embodiment of the invention, the metadata ovals in 223 are connected with lines to the circles in the "interpretations" field 209. A distinct color or pattern can be employed with respect to lines emanating from each of the terminal nodes 215/217. Generally, the thickness of a line 219 can correspond to a relative strength of the corresponding matching. Less important information about matches can be hidden or shown in a faded manner (e.g., as shown with respect to individual metadata snippet 225).

In accordance with at least one embodiment of the invention, ranking vectors 227 (as part of a fired rules display) can explain or depict ranking among the tracked results. Particularly, a ranking vector 227 can depict a numeric value for different aspects of the results (e.g., recency, number of tags), which are then aggregated to determine a final rank. In this manner, a user can come to understand how a particular result received its rank, and compare the individual quantitative factors contributing to the final score or rank of one result with those of another result. Thus, here, the ranking vectors 227 show how the two selected results (depicted in 215 and 217) compared to each other in each of several factors that contribute to a final score and ranking the present illustrative example, is specific implementation, the aggregation is simply to take the first winner among the documents (from top to bottom).

Figure 3:
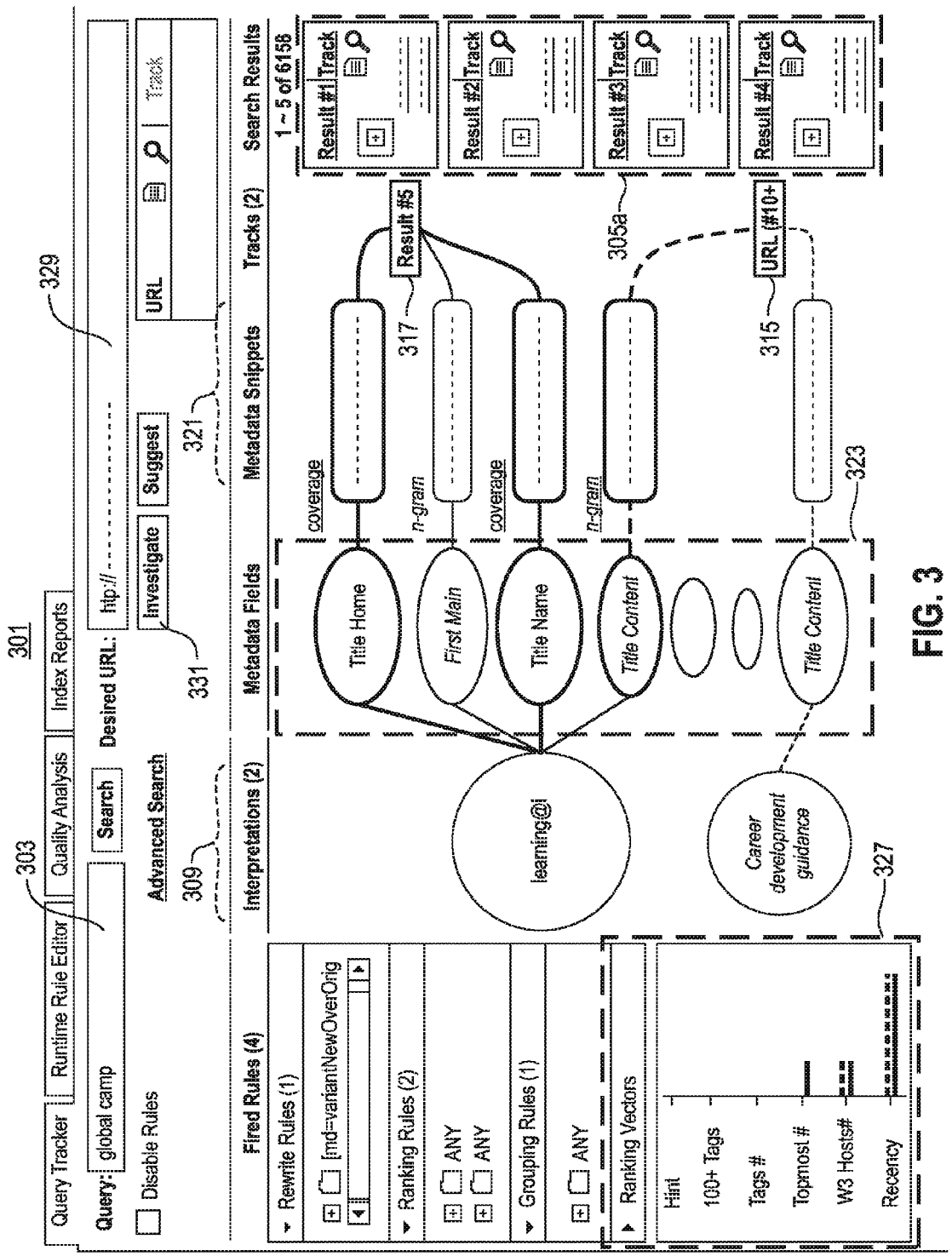
FIG. 3 illustrates a UI providing an investigation function.

FIG. 3 illustrates a UI providing an investigation function, in accordance with at least one embodiment of the invention. As such, a user can type in, at a box 329, the URL for a desired result for the query and click on an "Investigate" button 331 to learn where the document is located in the current result set (305*a*). The query provenance visualization allows the user to know why the result is being brought back at its current ranked position. Here, terminal node 315 relates to one track, and serves—in this "investigation screen"—as a placeholder for the "desired URL" from box 329 to be investigated.

Figure 4:
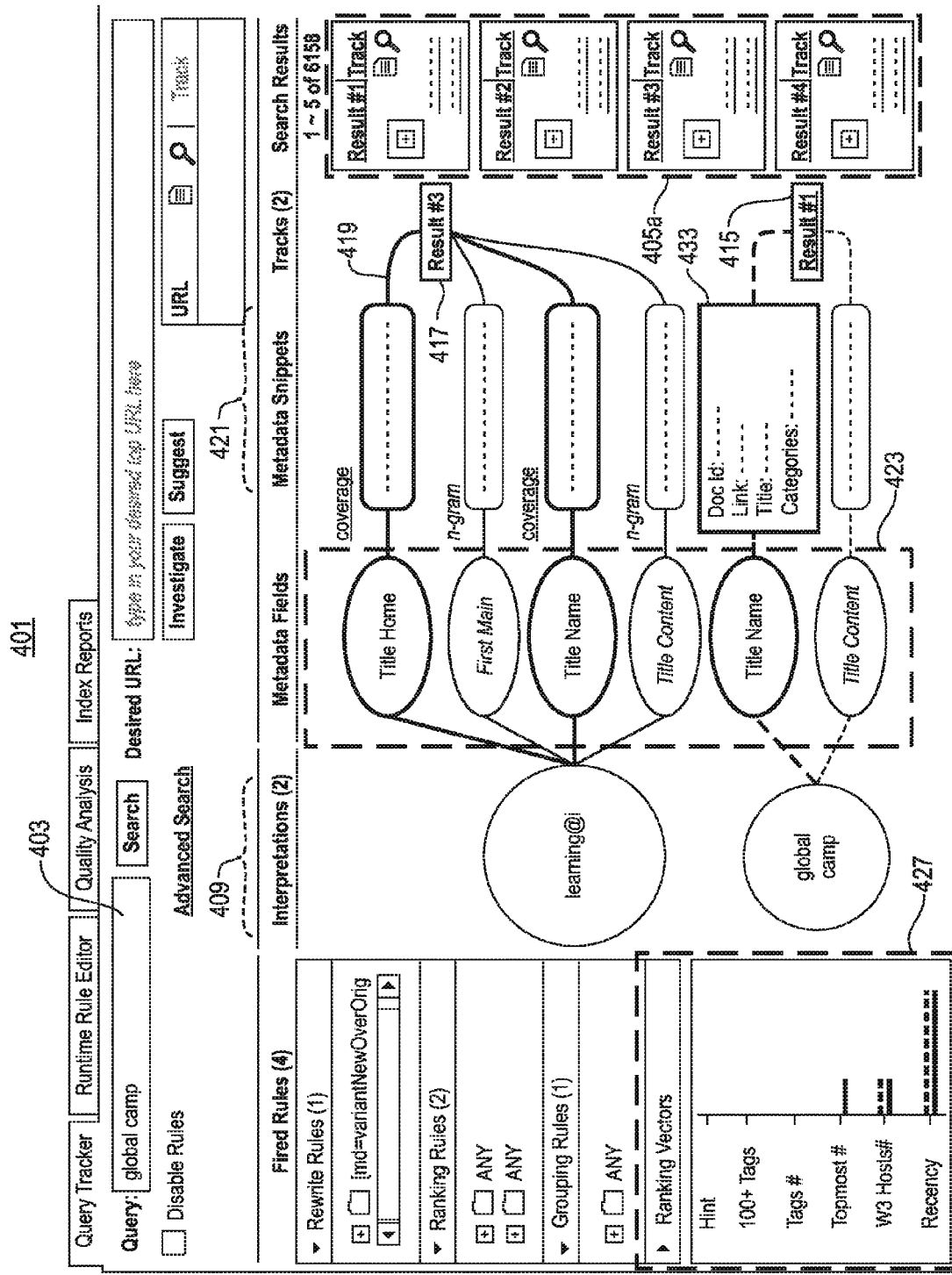
FIG. 4 illustrates a UI providing detailed information about a search result.
Figure 6:
FIG. 6 illustrates a UI displaying a webpage corresponding to a search result.

In accordance with at least one embodiment of the invention, when a user mouses over each of the components in the visualization, more detailed information can be displayed. Thus, for example, and as shown in FIG. 4, detailed information about a result can be shown when a terminal node 415 corresponding to a result is moused over. By way of another example, and as shown in FIG. 5, an actual Lucene document 535 corresponding to a result can be obtained (e.g., via a pop-up window). ("Lucene" is a trademark of the Apache Software Foundation, www.apache.org.) By way of another example, and as shown in FIG. 6, a representation 637 of an actual corresponding webpage can be displayed (e.g., via a pop-up window). The views shown in FIGS. 5 and 6 can be obtained essentially via any suitable arrangement or action, e.g., by clicking on a document icon next to a "Result" label (corresponding to a specific result) to obtain Lucene document 535, or by clicking on a magnifier icon next to a "Result" label to obtain the webpage representation 637

Figure 7:
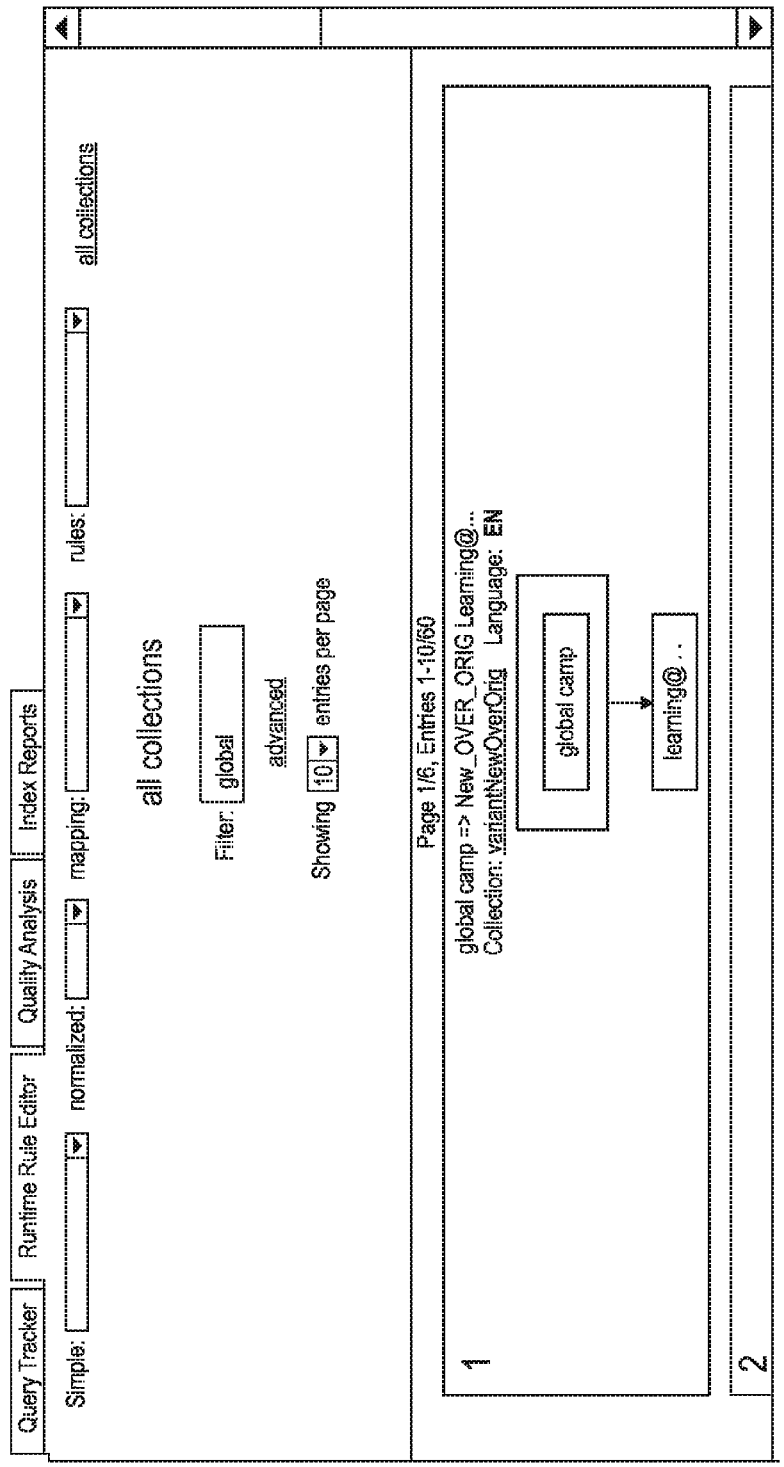
FIG. 7 illustrates a UI providing a runtime rule editor.

In accordance with at least one embodiment of the invention, and as illustrated in FIGS. 7-10, provisions are made to permit a user to lookup, edit, add, and remove runtime rules. As such, FIG. 7 illustrates a UI 701 providing a runtime rule editor. FIG. 8 depicts a UI 801 in a mode for editing rules, and FIG. 9 depicts a UI 901 showing results of such editing, by way of a saving and reloading configuration. FIG. 10 then illustrates a UI 1001 which provides an effect validation function and thereby depicts how an edited rule affects search results. Here in particular, by way of an illustrative example, the rewrite rules show a newly added rule 1039 that has been fired in the course of validation. Further, a new result (here, "Result 2") ends up being depicted with its own terminal block 1041 and corresponding track that connects to metadata snippets 1021, metadata fields 1023 and interpretations 1009 in a manner consistent with other examples described and illustrated herein. The ranking vectors 1027 also show the inclusion of the new result.

Figure 11:
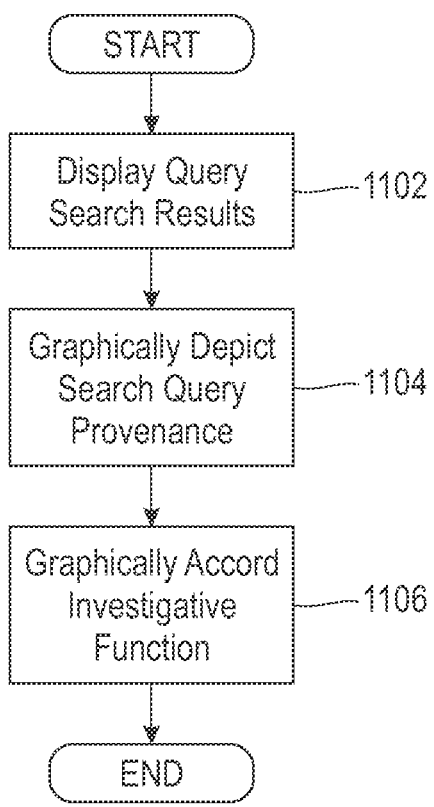
FIG. 11 sets forth a process more generally for enhancing search quality.

FIG. 11 sets forth a process more generally for enhancing search quality, in accordance with at least one embodiment of the invention. It should be appreciated that a process such as that broadly illustrated in FIG. 11 can be carried out on essentially any suitable computer system or set of computer systems, which may, by way of an illustrative and non-restrictive example, include a system such as that indicated at 12' in FIG. 12. In accordance with an example embodiment, most if not all of the process steps discussed with respect to FIG. 11 can be performed by way a processing unit or units and system memory such as those indicated, respectively, at 16' and 28' in FIG. 12.

As shown in FIG. 11, query search results are displayed (1102), and search query provenance related to the search results is graphically depicted (1104). There is graphically accorded an investigative function to avail investigation of at least one aspect of the search query provenance (1106).

Figure 12:
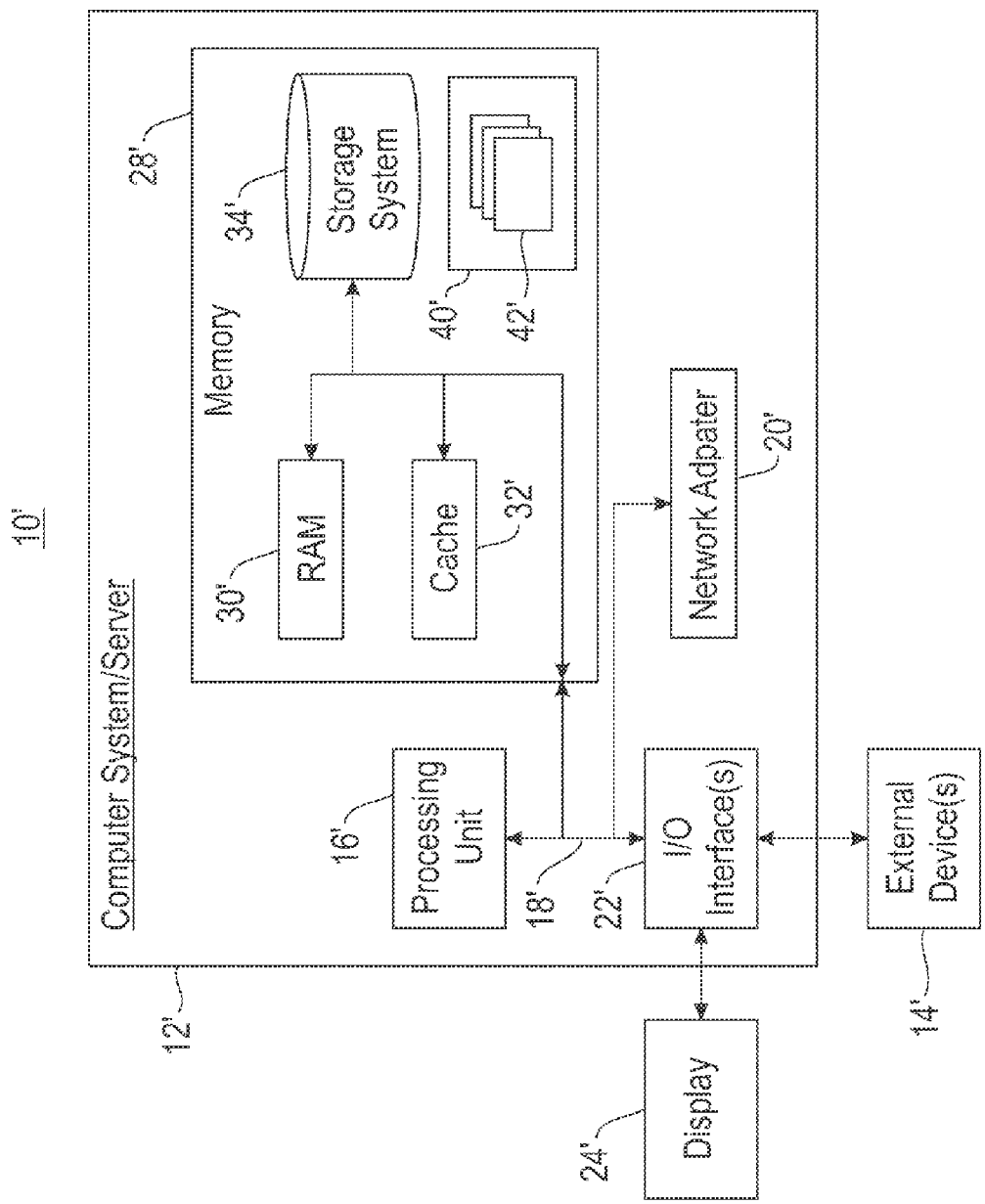
FIG. 12 illustrates a computer system.

Referring now to FIG. 12, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples, include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   displaying query search results; and
   graphically depicting search query provenance related to the search results;
   said depicting comprising:
   graphically according an investigative function to avail investigation of at least one aspect of the search query provenance;
   graphically displaying at least one interpretation rendered in producing the search results; and
   graphically displaying tracking of the search results;
   wherein said graphically displaying at least one interpretation comprises ranking interpretations rendered in producing the search results; and
   wherein said depicting comprises graphically displaying interpretations rendered in producing search results, via displaying for each interpretation a geometric shape of a size generally proportional to predominance of an interpretation in the search results.

2. The method according to claim 1, comprising displaying fired runtime query rules.

3. The method according to claim 2, wherein said according of a dynamic function comprises according a function for validating an effect of editing a search query rule.

4. The method according to claim 1, wherein said graphically displaying at least one interpretation comprises displaying a geometric shape of a size generally proportional to predominance of an interpretation in the search results.

5. The method according to claim 1, wherein said graphically displaying tracking comprises displaying at least one path from at least one node corresponding to a search result, the at least one path interconnecting at least one graphical representation corresponding to at least one member taken from the group consisting of: an interpretation rendered in producing search results; a metadata field; a metadata snippet.

6. The method according to claim 1, wherein said depicting comprises graphically displaying information specific to a URL that is related to at least one query search result.

7. The method according to claim 1, wherein said depicting comprises presenting at least one member taken from the group consisting of detailed information about at least one query search result; a Lucene document corresponding to at least one query search result; a representation of a webpage corresponding to at least one query search result.

8. The method according to claim 1, wherein said depicting comprises graphically displaying, in response to guiding input, contributing factors to a search result ranking.

9. The method according to claim 8, wherein said displaying of contributing factors comprises comparatively depicting contributing factors to at least two search result rankings.

10. The method according to claim 1, wherein said depicting comprises visually highlighting one aspect of search query provenance in comparison to another aspect of search query provenance by way of displaying comparative significance between aspects of search query provenance.

11. The method according to claim 1, comprising according a function for dynamically editing search query rules of a search engine.

12. The computer program product according to claim 1, wherein said computer readable program code is configured to display fired runtime query rules.

13. The computer program product according to claim 1, wherein said computer readable program code is configured to graphically display information specific to a URL that is related to at least one query search result.

14. The computer program product according to claim 1, wherein said computer readable program code is configured to graphically display, in response to guiding input, contributing factors to a search result ranking.

15. An apparatus comprising:
   at least one processor; and
   a computer readable storage medium having computer readable program code embodied therewith and executable by the at least one processor, the computer readable program code comprising:
   computer readable program code configured to display query search results;
   computer readable program code configured to graphically depict search query provenance related to the search results via:
   graphically according an investigative function to avail investigation of at least one aspect of the search query provenance;
   graphically displaying at least one interpretation rendered in producing the search results; and
   graphically displaying tracking of the search results;

wherein said graphically displaying at least one interpretation comprises ranking interpretations rendered in producing the search results; and wherein said depicting comprises graphically displaying interpretations rendered in producing search results, via displaying for each interpretation a geometric shape of a size generally proportional to predominance of an interpretation in the search results.

16. A computer program product comprising:

a non-transitory computer readable storage medium having computer readable program code embodied therewith, the computer readable program code comprising:

computer readable program code configured to display query search results;

computer readable program code configured to graphically depict search query provenance related to the search results via:

graphically according an investigative function to avail investigation of at least one aspect of the search query provenance;

graphically displaying at least one interpretation rendered in producing the search results; and graphically displaying tracking of the search results;

wherein said graphically displaying at least one interpretation comprises ranking interpretations rendered in producing the search results; and wherein said depicting comprises graphically displaying interpretations rendered in producing search results, via displaying for each interpretation a geometric shape of a size generally proportional to predominance of an interpretation in the search results.

* * * * *